Dec. 24, 1963  C. S. GLENNY  3,115,107
COMBINATION CONDIMENT RACK AND BARBECUE TOOL HOLDERS
Filed Aug. 23, 1961
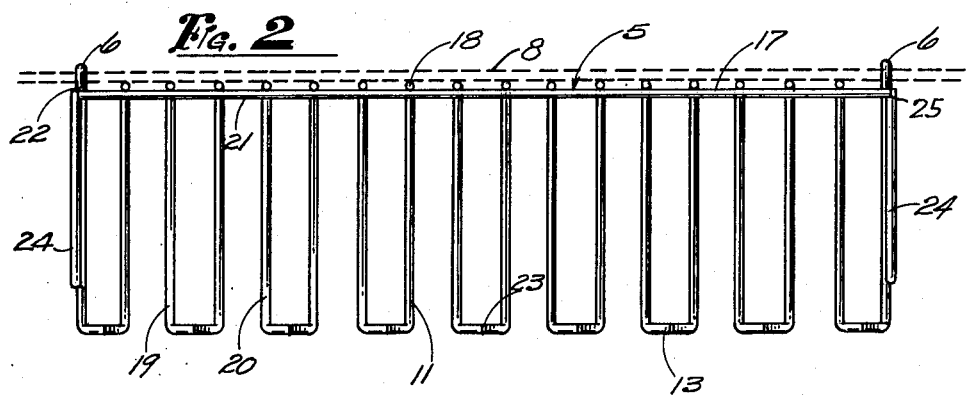
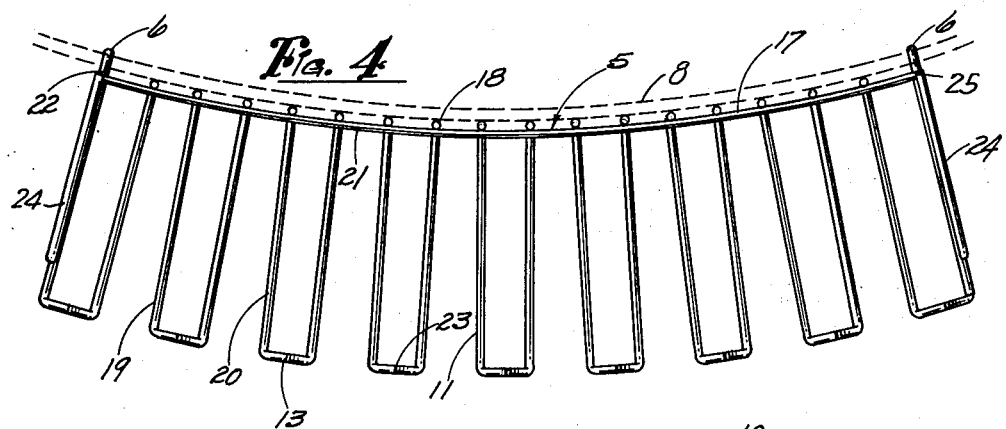
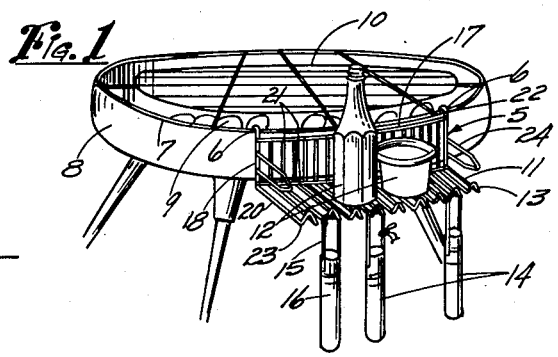
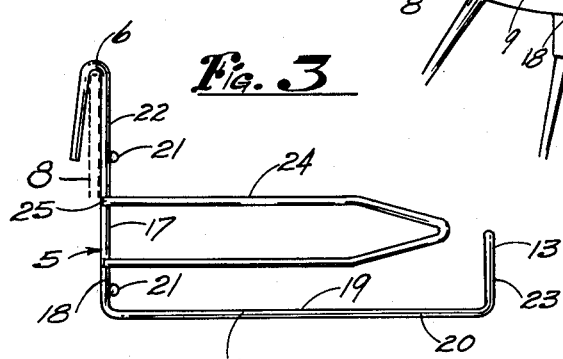
INVENTOR
Clarence S. Glenny, Deceased
by Margaret Glenny, Administrator
ATTY.

United States Patent Office 3,115,107
Patented Dec. 24, 1963

3,115,107
COMBINATION CONDIMENT RACK AND
BARBECUE TOOL HOLDERS
Clarence S. Glenny, deceased, late of Rockford, Ill., by Margaret Glenny, administrator, Rockford, Ill., assignor to The Washburn Company, Worcester, Mass., a corporation of Massachusetts
Filed Aug. 23, 1961, Ser. No. 135,705
1 Claim. (Cl. 108—152)

This invention relates to a combination condiment rack and barbecue tool holder especially designed for universal application to barbecue grills, the same being of wire construction and designed to be easily bendable from a normally straight form to an arcuate form so as to fit equally well on a rectangular grill or a round or oval-shaped grill or brazier.

The elongated generally rectangular wire supporting back frame provided in accordance with my invention has hooks on its opposite ends to engage over the top edge of a brazier bowl, and it is a simple matter to bend this frame, when necessary, to conform to the curvature of a round or oval-shaped bowl. Secured to the frame and spaced lengthwise thereof are vertical wires which are bent to L-shape to provide parts of a condiment rack, and each part also serves as a barbecue tool holder at the outer end thereof. The bending of the frame from a straight form to a curved form to suit different grills in no way affects these attached parts but merely fans them out more or less, depending upon the radius of curvature, each part being substantially radially disposed with respect to the curved frame but otherwise substantially at right angles thereto in its original straight form.

The invention is illustrated in the accompanying drawing, in which—

FIG. 1 is a perspective view of my improved combination condiment rack and barbecue tool holder, shown applied to the curved edge of a brazier bowl;

FIGS. 2 and 3 are a plan view and end view, respectively, of the article in its straight form; and FIG. 4 is a plan view of the article when the longitudinally extending back frame thereof has been bent to curved form, similarly as in FIG. 1.

The same reference numerals are applied to corresponding parts in these four views.

Referring to the drawing, the reference numeral 5 designates the condiment rack and barbecue tool holder of my invention generally, the same being shown in FIG. 1 as hooked, as indicated at 6, over the upper edge 7 of a brazier bowl 8, the latter containing charcoal or other fuel 9 and having a grill 10 mounted thereon. The rack 11 shows condiments 12 supported thereon, and the hooks 13 provided on the front of the rack serve the double purpose of retaining the condiments against accidental displacement from the rack and also as hangers or holders on which to hang barbecue tools 14 by means of loops 15 provided on the ends of the handles 16 of these tools, as illustrated in FIG. 1.

The article 5 is of wire construction throughout and comprises an elongated rectangular wire frame 17 forming the back wall of the article when the upwardly bent inner end portions 18 of the legs 19 of a plurality of laterally spaced U-shaped wire members 20, of which the rack 11 is composed, are welded to the two parallel horizontal wires 21 of the frame 17. The hooks 6 mentioned previously are defined by downwardly bent upper end portions of extensions 22 of the outer legs on the endmost U-shaped members 20. The front end portions 23 of the U-shaped members 20 are bent upwardly in the form of inverted Vs as clearly appears in FIGS. 1 and 3 to define the hooks 13 previously described. Generally U-shaped wires 24 are disposed horizontally at opposite ends of the article and have the ends of the arms thereof welded to the endmost wires 18, as at 25, to retain the condiments 12 on the rack 11 against displacement off the ends of the rack.

In operation, it should be clear that it is immaterial whether the article 5 is used in its original straight form or is bent to the arcuate form shown in FIGS. 1 and 4, the rack 11 serving to accommodate the condiments 12 equally well either way, inasmuch as the bending of the frame 17 does not alter the relationship of the neighboring members 20 forming the rack 11 enough to make any noticeable difference, as should be clear by comparison of FIGS. 2 and 4, the members 20 being substantially radially disposed with respect to the arc of curvature of the frame 17 in FIG. 4 and substantially at right angles with respect to the frame 17 in the straight form shown in FIG. 1. Of course, the loops 15 can be applied to the hooks 13 just as easily in either case for suspension of the barbecue tools 14. Thus, the barbecue tools are located out in front of the grill where they can be easily reached whenever needed and as quickly put away, and the condiments 12 are just as handily accommodated. Whatever heat is absorbed in the wire of the article 5 is quickly dissipated so that there is no danger of anyone burning his hands on this attachment.

It is believed the foregoing description conveys a good understanding of the objects and advantages of my invention. The appended claim has been drawn to cover all legitimate modifications and adaptations.

I claim:

For attachment interchangeably to a straight or a longitudinally arcuate substantially vertical side wall of a container, such as a brazier, a bracket attachment adapted to be detachably mounted on said wall and comprising an elongated vertical and substantially rectangular back wall comprising laterally spaced vertical end wires having hooks defined on their upper ends for hooking over the upper edge portion of said side wall for support of said attachment and vertically spaced horizontal wires secured at their ends to the vertical end wires, said back wall being normally straight for parallel relationship to and abutment with a straight side wall but being bendable to arcuate form lengthwise for similar abutment with the curved side wall, and article supports carried on said horizontal wires of said back wall in longitudinally spaced relation and forming a shelf on which articles may be placed, said horizontal wires of said back wall being bendable longitudinally thereof between said article supports, the latter each comprising a horizontal U-shaped wire element having the cross-portion of the U bent upwardly at right angles to provide an article suspension hook, these upwardly bent portions together defining an article retaining wall in outwardly spaced relation to said back wall, the legs of each U being bent upwardly in transverse relationship to the horizontal wires of said back wall and secured thereto, these article supports being free of any connection with one another at their outer ends so as to be free to assume positions in outwardly diverging relationship to one another radially of the arc when said horizontal wires are bent to arcuate form lengthwise for abutment with a curved wall.

References Cited in the file of this patent

UNITED STATES PATENTS

| | | |
|---|---|---|
| 483,069 | Legg | Sept. 20, 1892 |
| 886,495 | Haase | May 5, 1908 |
| 1,385,580 | Owen | July 26, 1921 |
| 1,767,545 | Mosabacher | June 24, 1930 |
| 2,314,490 | Goldman | Mar. 23, 1943 |
| 2,572,797 | Zimmer | Oct. 23, 1951 |
| 2,707,141 | Witter | Apr. 26, 1955 |
| 2,886,386 | Spitzer | May 12, 1959 |
| 2,956,689 | Togt | Oct. 18, 1960 |